United States Patent [19]
Petrillo

[11] Patent Number: 5,703,468
[45] Date of Patent: Dec. 30, 1997

[54] ELECTRICAL CHARGE CONTROL APPARATUS AND METHOD FOR PHOTOVOLTAIC ENERGY CONVERSION SYSTEMS

[76] Inventor: Gino A. Petrillo, 176 Tower St., Beaconsfield, Quebec, Canada, H9W 6B2

[21] Appl. No.: 616,965

[22] Filed: Mar. 15, 1996

[30] Foreign Application Priority Data

Mar. 17, 1995 [WO] WIPO ..................... PCT/CA95/00137

[51] Int. Cl.$^6$ .............................. H02J 7/00; H01M 10/44
[52] U.S. Cl. .................... 320/39; 320/30; 320/31; 320/35; 320/22
[58] Field of Search ................................. 320/21, 22, 30, 320/31, 35, 39

[56] References Cited

U.S. PATENT DOCUMENTS

| | | | |
|---|---|---|---|
| 3,919,618 | 11/1975 | Coleman et al. | 320/39 |
| 4,349,775 | 9/1982 | Kwon et al. | |
| 4,383,211 | 5/1983 | Staler | |
| 4,401,935 | 8/1983 | Yerkes | |
| 4,426,612 | 1/1984 | Wicnienski et al. | 320/39 |
| 4,622,509 | 11/1986 | Spruijt | |
| 4,661,758 | 4/1987 | Whittaker | 320/21 |
| 4,667,143 | 5/1987 | Cooper et al. | 320/35 X |
| 4,742,291 | 5/1988 | Bobier et al. | |
| 5,153,497 | 10/1992 | Eiden | 320/39 X |
| 5,332,957 | 7/1994 | Lee | |
| 5,396,163 | 3/1995 | Nor et al. | 320/39 X |
| 5,508,598 | 4/1996 | Al-Abassy | 320/39 X |

FOREIGN PATENT DOCUMENTS

| | | |
|---|---|---|
| 1124787 | 6/1982 | Canada |
| 1162607 | 2/1984 | Canada |
| 0 342 578 | 11/1989 | European Pat. Off. |
| 2 090 084 | 6/1982 | United Kingdom |

OTHER PUBLICATIONS

Proceedings of the 25th Intersociety Energy Conversion Engineering Conference, Aug. 12–17, 1990 Reno, Nevada, U.S.A. vol. 1, pp. 47–54, G. Dakermanij et al, "The Small Explorer Power System".

IEEE Transactions on Energy Conversion, vol. 4, No. 3, Sep. 1989, New York, U.S.A., pp. 308–313, XP 000039091, Z. Salameh et al, "Multi-Stage Dual Priority Regulator for Photovoltaic Systems".

*Primary Examiner*—Peter S. Wong
*Assistant Examiner*—K. Shin
*Attorney, Agent, or Firm*—Michael D. Bednarek; Kilpatrick Stockton LLP

[57] ABSTRACT

A charge control apparatus and method for charging of an electrical energy storage device, such as a rechargeable storage battery, by an electrical energy source, such as a photovoltaic panel, provides multiple charge setpoint selection means wherein the electrical connection of one or more setpoint control terminations to the three electrical potential contacts storage device "+", no contact (NC), or common "−", produces a specific and predefined charge setpoint condition, including charge termination and resumption voltage thresholds, from a plurality of charge setpoint possibilities. Temperature compensation is employed in multiple setpoint charge control to maintain setpoint thresholds essentially constant with apparatus temperature and to effect a change in setpoint thresholds with storage device temperature in accordance with storage device charging characteristics.

54 Claims, 8 Drawing Sheets

ELECTRICAL CHARGE CONTROL APPARATUS AND METHOD FOR PHOTOVOLTAIC ENERGY CONVERSION SYSTEMS

FIELD OF THE INVENTION

This invention relates generally to charge control apparatus and methods, and more specifically to an apparatus and method for establishing multiple charge voltage setpoints for a rechargeable electrical energy storage device, such as a rechargeable battery, when charged by means of an electrical energy source, such as a photovoltaic panel or array of photovoltaic panels.

BACKGROUND OF THE INVENTION

Photovoltaic charge controllers, or charge regulators, may be broadly grouped into four principal categories: 1. Shunt charge controllers. 2. Series charge controllers. 3. High-low rate controllers. 4. Specialty controllers, including DC-DC converter and other switched-mode types. The algorithm used to control current flow to the system battery may be based on simple battery voltage setpoints, involving a predefined "charge terminate" voltage threshold and "charge resume" voltage threshold, battery temperature or battery temperature gradients, charge integration techniques, or multi-parameter combinations. Moreover, the regulating function may be effected by simple linear control, on-off switching of a shunt or series control element, or pulse-width-modulation (PWM) techniques.

In all photovoltaic charge control approaches, the primary objectives are to obtain optimum system performance, while also achieving an acceptable level of system reliability and life-cycle cost. For deep-cycle, lead-acid batteries of the flooded or gelled electrolyte type, the state-of-charge (SOC) must be maintained within a narrow range, typically between 70–100% of full charge, to derive optimum performance, low maintenance, and extended life. Other battery systems have specific requirements which must be accommodated by the charge controller. One such storage battery is the nickel-cadmium (Ni-Cd) system, which exhibits better tolerance to overcharge and overdischarge compared to lead-acid types, but is susceptible to damage from thermal runaway during the recharging cycle. Advances in the current art of photovoltaic charge control apparatus and methods are needed in order to meet performance-reliability-cost objectives for the different types of rechargeable battery systems currently in use, the broad range of applications, and the special requirements imposed by severe climatic conditions.

It is appreciated that numerous photovoltaic battery charge controllers of the types described above are known in the art. Examples are Canadian Patent 1,124,787 to Barre, U.S. Pat. No. 4,349,775 to Kwon and Lawson, U.S. Pat. No. 4,383,211 to Staler, U.S. Pat. No. 4,401,935 to Yerkes, Canadian Patent 1,162,607 to Kwon and Lawson, U.S. Pat. No. 4,622,509 to Spruijt, and European Patent 342,578 to Canal.

In Canadian Patent 1,124,787, DC-DC converter circuits are provided for charging a Ni-Cd battery having a nominal voltage of 1.2 V, from the low voltage supplied by a single solar cell, typically 0.5 V.

Examples of high-low rate controllers are found in U.S. Pat. No. 4,383,211 and U.S. Pat. No. 4,401,935. In U.S. Pat. No. 4,383,211, an apparatus and method is disclosed for regulating the charging of a rechargeable battery by a photovoltaic panel, by either a direct connection through a relay, or alternatively, through a float regulator. In this disclosure, the direct connection between the panel and battery is broken at preselected intervals to permit the voltage levels of the panel and battery to be tested. The ratio of the voltages is used to determine if a direct connection should be reestablished, or trickle charging through the float regulator should occur. U.S. Pat. No. 4,401,935 discloses an apparatus and method for controlling the charging of a rechargeable battery by a photovoltaic panel and discharging the battery through a lead, in which a relay is switched between a first condition coupling of the battery to the lead and a float regulator, and a second condition coupling of the battery directly to the panel.

Exemplary photovoltaic charging systems which employ temperature compensated charging regulation may be found in U.S. Pat. No. 4,349,775 and U.S. Pat. No. 4,622,509. In U.S. Pat. No. 4,349,775, there is provided means for automatic adjustment of the regulator's reference potential in response to monitored temperature changes, thereby providing temperature compensation of the maximum charging voltage and improved protection of the system battery. U.S. Pat. No. 4,622,509 discloses a method and circuit for Ni-Cd battery charge control in low earth orbit spacecraft applications, according to which battery charging is terminated when the battery temperature starts to increase following a decrease at the end of charge.

Canadian Patent 1,162,607 and European Patent 342,578 provide disclosures which are based on extensions of the shunt control method of photovoltaic battery charge regulation. In Canadian Patent 1,162,607, there is provided an apparatus which selectively includes portions of the photovoltaic array, or alternatively shunts portions of the photovoltaic array, to provide appropriate charging voltage to the storage batteries. In this approach, the photovoltaic array is electrically subdivided into subarrays which are sequentially removed from, or included in, the charging circuit, based on the measured terminal voltage of the battery. European Patent 342,578 discloses a charge control apparatus and method comprising one or more subarrays of photovoltaic panels connected in series, wherein a fixed portion of the subarray is shunted or alternatively contributing to battery charging, depending on measured battery potential compared to predefined voltage setpoints.

In summary, the prior art has evolved to provide varied and effective means for the control of battery charging in photovoltaic systems involving a specific battery type, application, and climatic environment. However, simple and reliable means for selecting a specific condition of charge voltage setpoints from a plurality of possible charge voltage setpoint conditions within the same charge control apparatus, have either not been addressed, or have involved the use of control elements such as switches or potentiometers to provide such multiple selection means. The use of electromechanical devices, such as switches and potentiometers, to provide multiple charge voltage setpoint selection means, is undesirable in many photovoltaic applications, however, because of the inherent lack of reliability of these devices and the necessity to breach the mechanical integrity of the controller housing in order to accommodate and access such devices. This is particularly true in severe environment applications, such as in maritime aids to navigation, where salt-spray conditions impose strict packaging and electronic reliability requirements.

Therefore, in many photovoltaic battery charging applications, it is desirable to provide a simple and reliable means for selecting charge voltage setpoints from a plurality of charge voltage setpoint possibilities, based on battery type and other system considerations, in order to achieve optimum system performance, high reliability, and maximum system life in polar, equatorial, and temperate climatic environments.

SUMMARY OF THE INVENTION

It is thus an object of the present invention to provide a circuit and method which permits multiple charge voltage setpoints in photovoltaic battery charging apparatus, thereby making it possible to set an optimum charge terminate voltage threshold and charge resume voltage threshold based on battery type, temperature conditions, load characteristics, and other system considerations.

It is a further object of the present invention to provide temperature compensation means for said multiple charge voltage setpoint means so that charge voltage setpoints remain substantially unaffected by temperature variations in the charge control apparatus arising from ambient temperature changes or temperature changes brought about by dissipative elements within, or in proximity to, the charge control apparatus.

It is a further object of the present invention to provide battery temperature sensing means so that charge voltage setpoints established by said multiple charge voltage setpoint means will vary with battery temperature in a predetermined manner in order to maintain an optimum battery charge condition over the recommended operating temperature range of the battery.

It is a further object of the present invention to provide mechanical configurations for said multiple charge voltage setpoint means, so as to permit the implementation of said means in a simple and reliable manner, thereby improving performance while at the same time maintaining a high level of reliability in photovoltaic charge control apparatus.

To achieve the foregoing objects, and in accordance with the purposes of the invention as embodied and broadly described herein, there is provided a method of charge control for rechargeable batteries, particularly used in photovoltaic systems, which comprises the electrical connection of one or more voltage setpoint control terminations to one of three electrical potential contacts, each connection thus executed resulting in a specific and predefined charge voltage setpoint condition for charge terminate voltage threshold and charge resume voltage threshold, the three electrical potential contact being: battery "+"; no contact (NC); common "−".

According to an advantageous feature of this embodiment, connections between the charge control apparatus, including voltage setpoint control terminations, and the photovoltaic system, are executed within a photovoltaic panel junction box, power distribution panel, control panel, or other suitable enclosure capable of providing said connections adequate environmental protection.

According to an advantageous embodiment of the method according to the invention, temperature is measured within the charge control apparatus by means of a suitable temperature sensor, and used to provide temperature compensation of charge voltage setpoint thresholds, so as to maintain charge voltage setpoint thresholds substantially constant with changes in charge control apparatus temperature, resulting from environmental temperature changes, or temperature changes due to dissipative elements within, or in proximity to, the charge control apparatus.

According to another advantageous embodiment of the method according to the invention, battery temperature is measured and used to continuously modify charge voltage setpoint thresholds in a predefined manner, such that charge terminate and charge resume threshold voltage potentials increase with decreasing battery temperature and decrease with increasing battery temperature, in accordance with recommended battery charging specifications.

According to an advantageous feature of this embodiment, battery temperature is measured through a direct connection to a battery terminal post, by means of a suitable temperature sensor and connection cable, said connection cable interposed between the temperature sensor and charge control means.

To implement the foregoing methods, and in accordance with the purposes of the invention as embodied and broadly described herein, there is provided a circuit for the selection of charge voltage setpoints from a plurality of charge voltage setpoint possibilities, wherein said circuit comprises comparator means, said comparator means having a plurality of bias voltage potential possibilities at one input, corresponding to a plurality of charge voltage setpoint possibilities, and a reference voltage potential at another input, the inputs to said comparator means deriving their potentials from the storage battery to be charged.

According to an advantageous embodiment of the circuit according to the invention, a plurality of charge voltage setpoint control resisters are interposed between the bias input of said comparator means and a plurality of charge voltage setpoint control terminations.

According to another advantageous embodiment of the circuit according to the invention, the internal temperature of the charge control apparatus is measured by means of a suitable temperature sensor, for example a thermistor, and used to modify in a predefined manner the bias voltage of said comparator means employed in voltage setpoint control, in order to maintain charge voltage setpoint thresholds substantially constant with changes in charge control apparatus temperature.

According to yet another advantageous embodiment of the circuit according to the invention, battery temperature is measured by means of a suitable temperature sensor, for example a thermistor, through a direct connection of said temperature sensor to the POSITIVE battery terminal post, by means of a connection cable, said connection cable interposed between the temperature sensor and charge control apparatus, wherein said temperature measurement is used to modify in a predefined manner the bias voltage of said comparator means employed in voltage setpoint control, such that charge voltage setpoint thresholds increase with decreasing battery temperature and decrease with increasing battery temperature.

To implement the foregoing methods and circuits, and in accordance with the purposes of the invention as embodied and broadly described herein, there is provided a mechanical means for the selection of charge voltage setpoints from a plurality of charge voltage setpoint possibilities, wherein said mechanical means comprises a plurality of control leads, each lead constituting a charge voltage setpoint control termination, said control leads emanating from a suitable enclosure for charge control apparatus, including comparator circuit means, through a suitable cable gland connector attached to said enclosure.

According to another advantageous embodiment of the methods and circuits according to the invention, there is provided a mechanical means for the selection of charge voltage setpoints from a plurality of charge voltage setpoint possibilities, wherein said mechanical means comprises a plurality of terminal contacts in the form of a terminal strip, each contact constituting a charge voltage setpoint control termination, said contacts attached to a suitable enclosure for charge control apparatus, including comparator circuit means.

BRIEF DESCRIPTION OF THE DRAWINGS

Additional objects and advantages of the invention are set forth in the detailed description of the preferred embodiments, in conjunction with the following drawings, wherein.

DETAILED DESCRIPTION OF THE PREFERRED EMBODIMENTS

Figure 1:
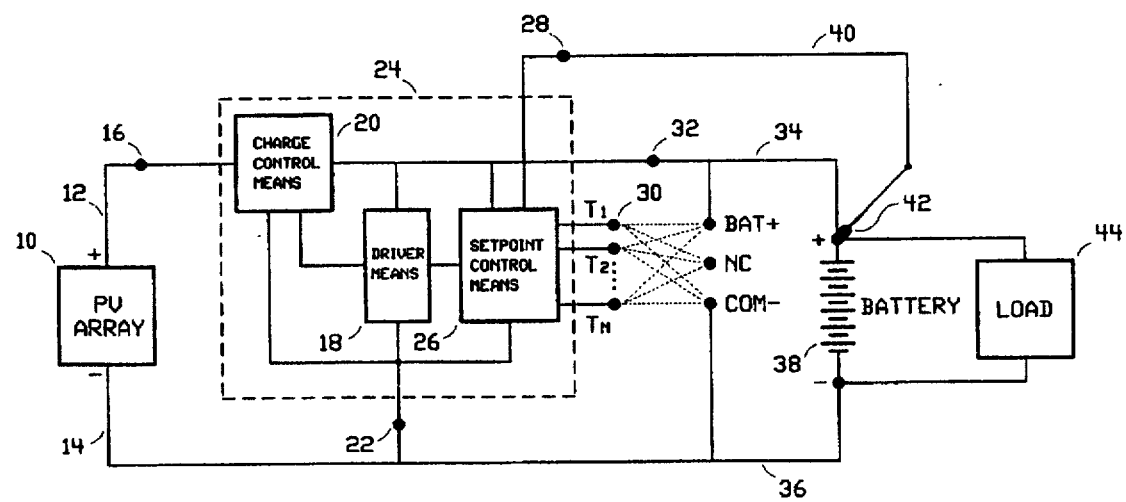
FIG. 1 illustrates a simplified block diagram of a photovoltaic system implementation of multiple charge voltage setpoint control, according to the principles of the invention.

The preferred embodiments of the present invention are now described with reference to the accompanying Figures, wherein the same reference numerals are used for the same elements throughout the various views.

The photovoltaic battery charging system of FIG. 1 illustrates, in block diagram form, the apparatus aspects of the invention and operates according to the methods aspects described herein. Charge control apparatus, collectively designated 24, is interposed between photovoltaic array 10 and storage battery 38, with load 44 optionally connected to derive operative power from battery and photovoltaic array. Photovoltaic array 10 may comprise any suitably arranged plurality of series and/or parallel connected solar cells. Storage battery 38 may be a single battery, a plurality of series and/or parallel connected battery cells or a battery array. According to a preferred embodiment of this invention, the battery may be of the rechargeable lead-acid type, although it is appreciated that other rechargeable battery systems of the dry and wet cell type may be used with an appropriate choice of charging parameters in accordance with the particular charging characteristics of the battery.

The charge control apparatus of FIG. 1 generally comprises setpoint control means 26, driver means 18, and charge control means 20. Charge control means 20 may take any of the forms designated by the blocks 200, 300 and 400 in FIGS. 3 through 6 according to known charge control techniques, or other forms not illustrated. In particular, the charge control means 20, may be of the simple shunt or series switched element type, the high-low charge rate type featuring both series switched element and float regulator, or a conventional linear regulator. Thus, charge control means 20 is operative, to include, remove, or regulate charging power provided by photovoltaic array 10, thereby preventing over charging or under charging of storage battery 38, said charge control effected in cooperation with driver means 18 and setpoint control means 26.

Driver means 18 may be any suitable element operable to energize and de-energize charge control means 20 in cooperation with setpoint control means 26. Examples of suitable driver means include transistor switches, Darlington circuits and integrated circuit operational amplifier configurations.

The parameters which are considered critical to the system level performance of the charge control apparatus of the present invention are the temperature compensated, battery temperature dependent setpoint voltage thresholds. In keeping with generally accepted practice, a charge voltage setpoint condition, Vsp, in the present context refers to a specific combination of charge terminate threshold voltage, Vct, and charge resume threshold voltage, Vcr, both thresholds derived from the terminal voltage potential of the battery. Thus, Vct is the battery voltage at which charging current is either terminated or reduced to a maintenance level and Vcr is the battery voltage at which the regulator resets to the high rate charge mode. In particular, Vct is selected to correspond closely to the temperature dependent full charge condition of the system battery, while Vcr is selected based on depth of discharge and cycle life considerations.

The setpoint control means 26 generally comprises a plurality of voltage setpoint control terminations T1, T2 . . . Tn, collectively designated 30, and battery temperature measurement termination 28, connected to temperature sensor means 42 through cable 40. In a preferred embodiment, there is provided multiple voltage setpoint charge control comprising the electrical connection of one or more voltage setpoint control terminations 30, to one of the three electrical potential contacts battery "+" (BAT+), no contact (NC), and common "−" (COM−), each connection thus executed resulting in a specific and predefined voltage setpoint condition for charge terminate voltage threshold and charge resume voltage threshold. It is readily apparent from the foregoing that the number of distinct voltage setpoint conditions which are possible according to this invention, Nsp, is given by the simple relation, $$Nsp=3^n,$$

where n is the number of voltage setpoint control terminations.

Figure 2:
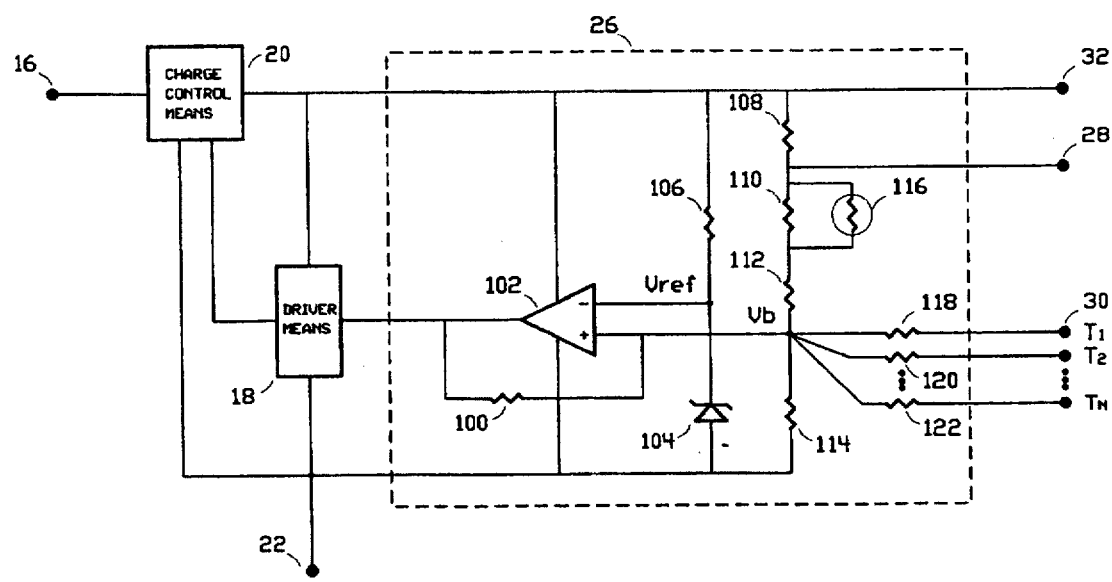
FIG. 2 illustrates a simplified circuit schematic embodying multiple charge voltage setpoint control, according to the principles of the invention.

A circuit schematic of one embodiment of setpoint control means 26 is illustrated in FIG. 2. Operational amplifier 102 is configured as a comparator to provide a high V+ output, substantially equal to the positive battery voltage, when the voltage at its noninverting input rises above the level at its inverting input, and a ground output, substantially equal to zero, when the voltage at its noninverting input falls below the level at its inverting input, in conventional format. A reference voltage Vref, is derived from zener diode 104 and resistor 106, and applied to the inverting input. At the noninverting input is a bias voltage Vb, proportional to battery voltage as derived from a resistive divider network comprising resisters 114, 112, 110 and 108, and thermistor 116. Terminal 28 is provided for external connection to one end of battery temperature sensing thermistor 42, through extension cable 40, as shown in FIG. 1, the other end of said thermistor being connected to the positive battery terminal, effectively placing said thermistor in parallel with resistor 108. The input impedance of operational amplifier 102 is sufficiently high to permit the resistive network thus formed at its noninverting input to function as a voltage divider.

Functionally described, comparator means 102 is configured to monitor the terminal voltage of the battery, through bias voltage Vb, and compare this voltage to reference voltage Vref. With the battery being charged and approaching the charge termination voltage threshold Vct, the bias voltage Vb will be less than but approaching the reference voltage Vref. When battery voltage increases such that Vb rises above Vref, a transition in the output state of operational amplifier 102 occurs, which in the present context involves a transition from essentially zero potential to a potential approximately equal to the battery voltage. Feedback resistor 100 is interposed between the noninverting input and the output of operational amplifier 102 to provide hysteresis and smooth state transitions. Battery terminal voltage must, therefore, drop to some lower level in order to effect a change in state of the comparator output, hence charge controller charge mode. Thus, the circuit networks at noninverting and inverting inputs of operational amplifier means 102, including feedback resistor 100, operate to provide a defined setpoint condition for charge terminate voltage Vct, and charge resume voltage Vcr. The transitions thus established, operate through driver means 18 and charge control means 20, to define the battery charging properties of the system.

Thermistor 116 functions to maintain a given setpoint condition for Vct and Vcr essentially constant with temperature. Battery temperature sensing thermistor 42, depicted in FIG. 1, functions to increase Vct and Vcr with decreasing battery temperature and decrease Vct and Vcr with increasing battery temperature, in a predefined manner in accordance with battery charging characteristics. Both temperature compensation means are operative by altering bias voltage Vb in a predefined manner to achieve the required temperature characteristics of the charge control apparatus. Resistors 110 and 108 operate to establish temperature coefficients and asymptotic endpoint boundaries for temperature compensation thermistor 116 and battery temperature Sensing thermistor 42, respectively.

In a preferred, embodiment, multiple charge voltage setpoints are provided by setpoint control resistors 118, 120 and resistors likewise configured but not explicitly shown, up to resistor 122, said resistors interposed between the noninverting input of comparator operational amplifier 102 and corresponding charge voltage setpoint control terminations labelled T1 through Tn and collectively designated 30. Thus, connection of any charge voltage setpoint control termination T1 through Tn to any one of the three electrical potential contacts battery "+", no contact (NC), and common "−", provides a specific bias voltage condition Vb, at the noninverting input of operational amplifier 102, and hence a specific charge voltage setpoint condition for charge terminate voltage threshold Vct, and charge resume voltage threshold Vcr.

Figure 3:
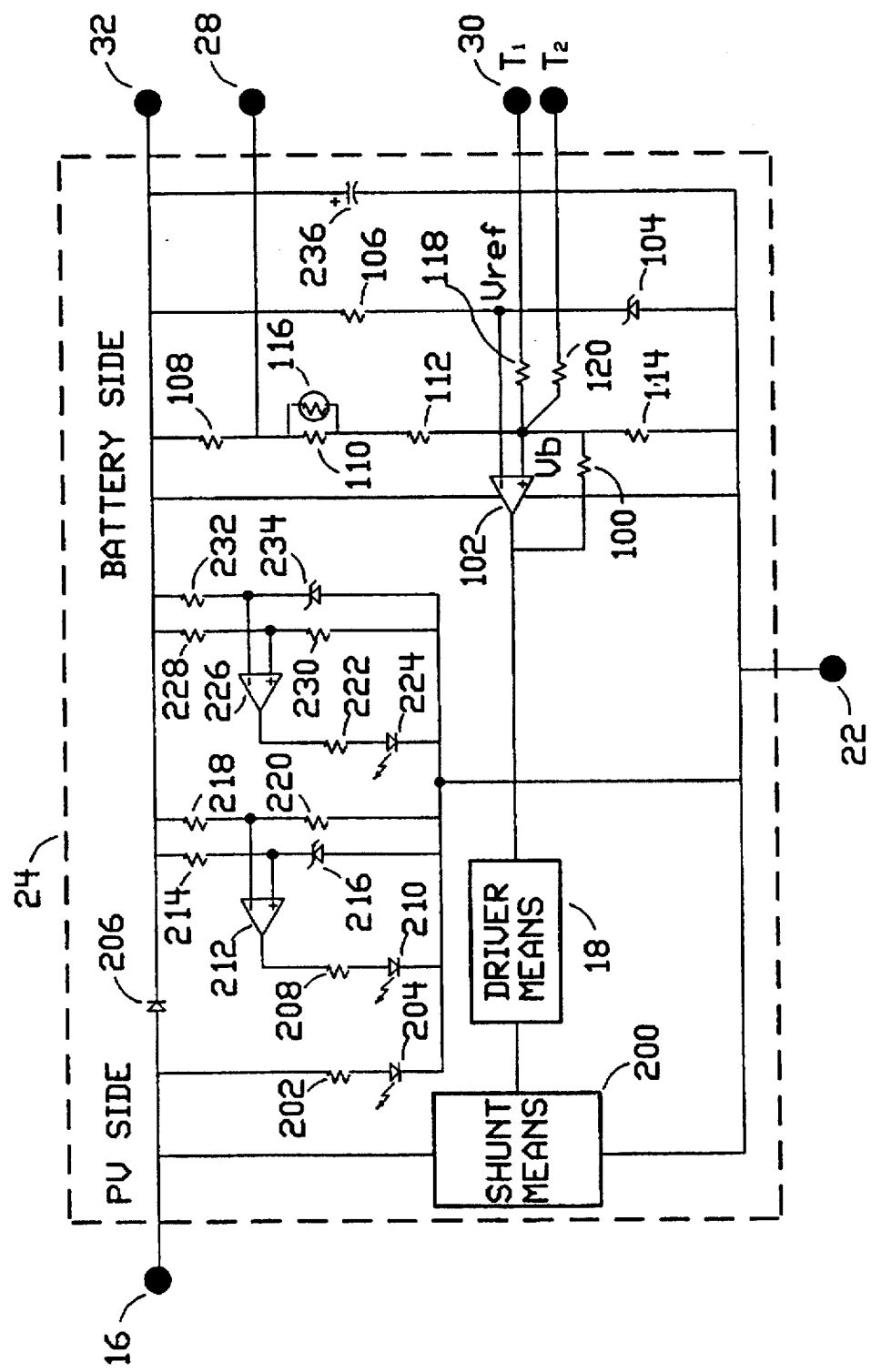
FIG. 3 illustrates a detailed circuit schematic of a preferred embodiment of the invention for the case of shunt charge control.

By way of example and not limitation, and with reference to FIG. 3, there is shown an electrical schematic representing the configuration of a preferred embodiment of the invention for the well-known case of shunt charge control. As indicated in the foregoing discussion, the number of distinct charge setpoint conditions Nsp, is $3^n$, where n is the number of setpoint control terminations configured according to this invention. A practical utilization of this invention might involve one or two setpoint control terminations, providing 3 or 9 distinct setpoint control conditions, respectively. Therefore, for convenience of illustration and ease of understanding, FIG. 3 and subsequent depictions of preferred embodiments are based on the implementation of one or two setpoint control terminations.

With reference to FIG. 3, shunt charge control apparatus collectively designated 24, is comprised of setpoint control means configured around operational amplifier element 102 and described in detail in association with FIG. 2, driver means 18, and shunt means 200. Blocking diode 206 is operative to isolate the battery during shunting of the photovoltaic source and also to prevent discharge of the battery through the photovoltaic source during low-light conditions, for example at night. A Schottky diode having low forward voltage drop is commonly used for blocking diode element 206. A capacitor 236, is provided to filter out noise and reduce controller switching frequency in the event that the photovoltaic source is active and no battery is connected. Shunt means 200 may be a solid-state semiconductor device, such as a bipolar or field effect transistor, or an electromechanical device, such as a relay. Driver means 18 may take several forms, depending on the type of shunt element used. In particular, a shunt element comprised of a power FET may be driven directly by comparator operational amplifier 102, making a separate driver circuit unnecessary. In contrast, a relay shunt element may require a simple transistor or Darlington driver stage.

In a preferred embodiment, there is also provided in the apparatus of FIG. 3 display means comprising LED 204 with current limiting resistor 202, to indicate charging when on and shunting when off, low battery voltage display means comprising LED 210 with current limiting resistor 208 and the comparator network associated with operational amplifier 212, and high battery voltage display means comprising LED 224 with current limiting resistor 222 and the comparator network associated with operational amplifier 226. Low battery display LED 210 is activated when battery voltage measured by means of voltage divider network comprising resisters 218 and 220, falls below the reference voltage produced by resistor 214 and zener diode 216. Similarly, high battery display LED 224 is activated when battery voltage measured by means of voltage divider network comprising resisters 228 and 230, rises above the reference voltage produced by resistor 232 and zener diode 234.

Charge controller 24 of FIG. 3 would ideally be housed in a weatherproof enclosure, with terminations to permit system connection and setpoint control located outside said enclosure. Preferred embodiments of mechanical means to implement the methods and circuits of this invention are considered in detail with reference to FIGS. 7 and 8.

Figure 4:
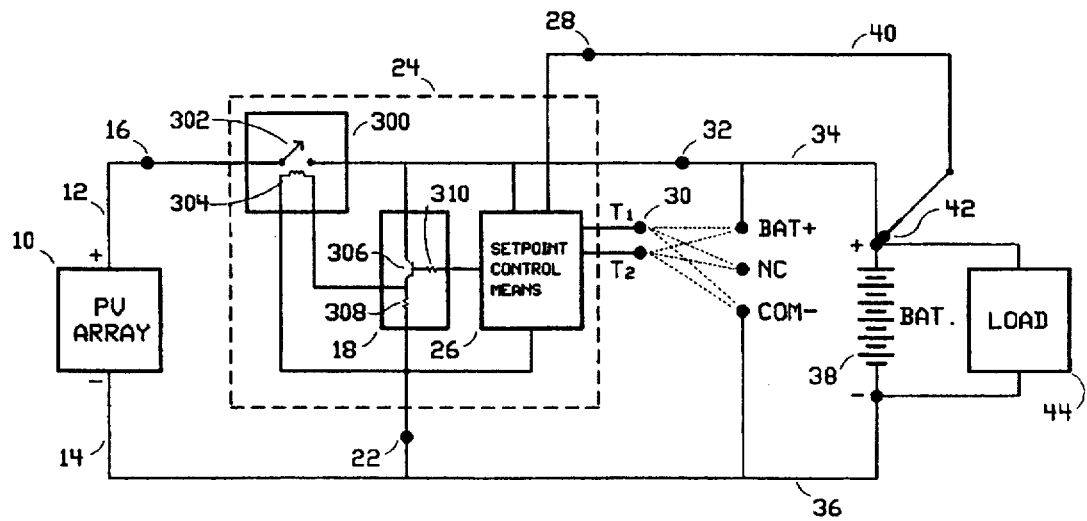
FIG. 4 illustrates a block diagram of a series charge control implementation of the present invention.
Figure 5:
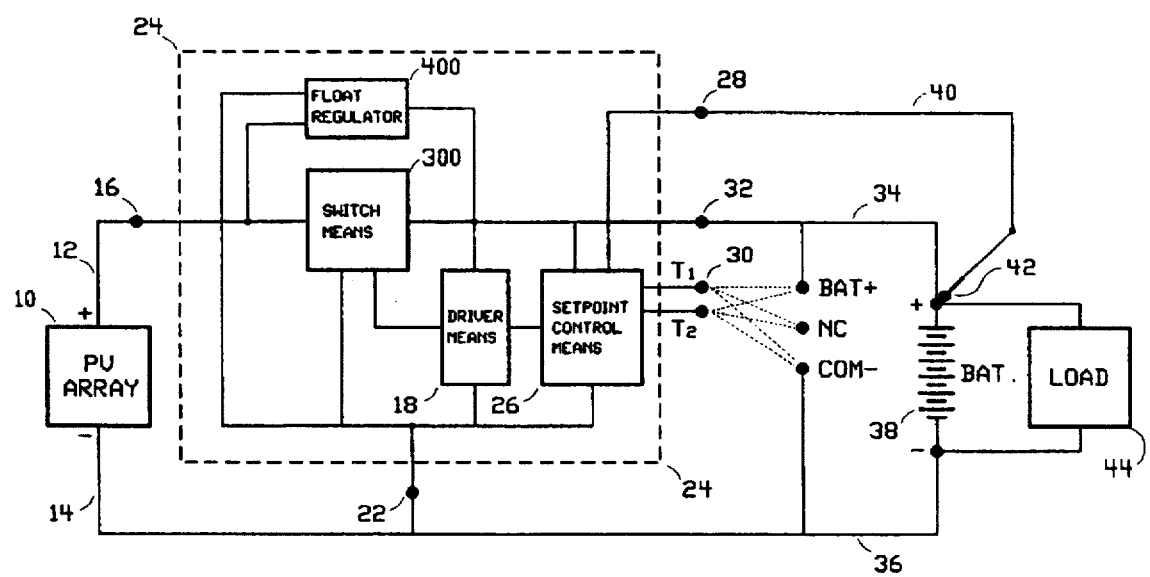
FIG. 5 illustrates a block diagram of a series high-low rate controller implementation of the present invention.
Figure 6:
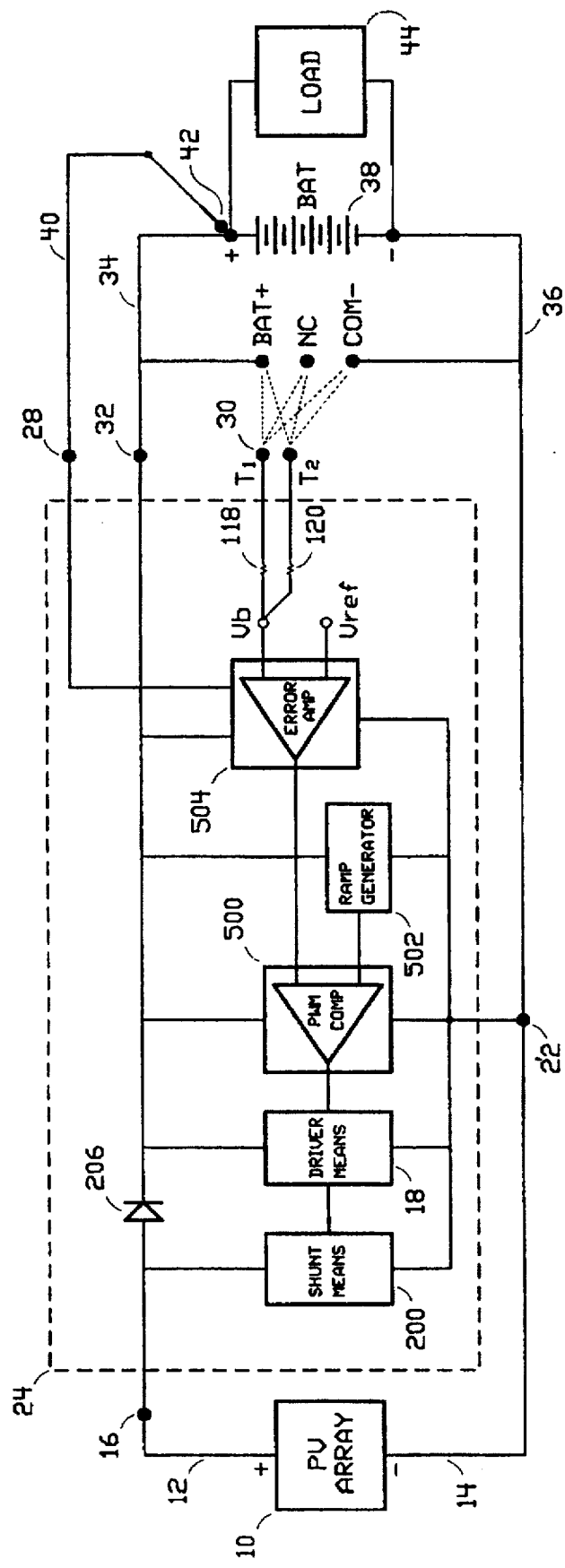
FIG. 6 illustrates a block diagram of a shunt PWM controller implementation of the present invention.

Additional preferred embodiments of this invention are illustrated in FIGS. 4 to 6, wherein FIG. 4 depicts a relay-operated, series-pass charge control implementation, FIG. 5 depicts a high-low charge rate control implementation, and FIG. 6 depicts a PWM shunt control implementation.

In FIG. 4, relay means 300 comprising switch element 302 and coil element 304, is interposed between photovoltaic array 10 and storage battery 38. Driver means 18, comprising switching transistor 306, emitter resistor 308 and base resistor 310, is responsive to setpoint control means 26 to activate relay means 300 to on during the charging cycle and off when full charge has been reached. Setpoint control means 26, is operative to establish the charge voltage thresholds at which relay means 300 is activated and deactivated, corresponding to the full charge terminate threshold Vct and charge resume threshold Vcr, said thresholds determined by the connection of multiple setpoint control terminations 30 and compensated for battery temperature variations by means of sensor termination 28, extension cable 40 and thermistor 42. Obviously, charge control means 300, comprising a relay switch, may take other forms, including solid-state semiconductor variants, with an appropriate choice of driver means 18.

FIG. 5, illustrates a high-low charge rate control embodiment of the present invention, wherein switch means 300 and float regulator means 400, are interposed between photovoltaic array 10 and storage battery 38. As in previously discussed embodiments, driver means 18, under control of battery temperature compensated setpoint control means 26, acts on switch means 300 to effect high rate charging when switch means 300 is closed, or low rate charging through float regulator 400, when switch means 300 is open. Thus, switching from a high charge rate to a low charge rate and vice versa, occurs at setpoint thresholds established by setpoint control means 26, in accordance with multiple setpoint control as provided in this invention. In a preferred embodiment, the threshold for high charge rate termination is set somewhat below the full charge voltage of the battery. Once this high charge rate termination threshold is reached, float regulator 400 continues battery charging at a progressively lower charge current until full charge of the battery is achieved. Thus, float regulator 400 may be a simple series-pass linear regulator, whose function it is to continuously limit charging current down to a trickle maintenance level when battery potential reaches full charge. Float regulator means 400 may take many forms, depending on the specific application and charging characteristics required. Examples of float regulator implementations include simple series-connected zener diode elements of appropriate current rating and breakdown voltage, transistor configurations, and commercially available dedicated regulator integrated circuit devices.

With reference to FIG. 6, there is illustrated a simplified block diagram of a shunt PWM charge control embodiment of the present invention, collectively designated 24 and comprising shunt means 200, blocking diode means 206, driver means 18, PWM comparator means 500, ramp generator means 502, and battery temperature compensated error amplifier means 504, which incorporates multiple charge setpoint control. At sufficiently low battery voltage, corresponding to a low state-of-charge of the battery, shunt element 200 is open and the entire current produced by the photovoltaic array is utilized in charging the battery. When a predetermined battery voltage is reached, corresponding to a voltage threshold established by setpoint control means 118, 120 and 30, error amplifier 504 produces a DC output with a magnitude proportional to the difference between temperature compensated, battery voltage dependent bias voltage Vb, and reference voltage Vref. The DC level output thus produced is fed, together with a ramp waveform generated by ramp generator means 502 and having a typical frequency of 100 Hz., to PWM comparator means 500. The output of PWM comparator means 500 is a width modulated train of pulses, which drive shunt means 200, through driver means 18. Thus, shunt means 200 is switched on and off at the PWM frequency, with a duty cycle, and hence average battery charging current, which is continuously variable and dependent on the battery state-of-charge. As the battery approaches full charge, the PWM control apparatus maintains a trickle charge rate by shunting current from the photovoltaic array for a significant portion of the PWM cycle.

In a preferred embodiment of this invention for the case of PWM charge control, there is provided a PWM charge setpoint selection means comprising the electrical connection of one or more setpoint control terminations to one of three electrical potential contacts, each connection thus executed resulting in a specific and predefined charge setpoint condition for the termination and resumption of PWM charge control, the three electrical potential contacts being: battery "+"; no contact (NC); common "−".

To permit the practical utilization of the foregoing methods and circuits in accordance with the purposes of the invention as embodied and broadly described herein, two exemplary mechanical variants are hereinafter described for the selection of charge voltage setpoints from a plurality of charge voltage setpoint possibilities, said mechanical variants depicted in the isometric views of FIGS. 7 and 8.

Figure 7:
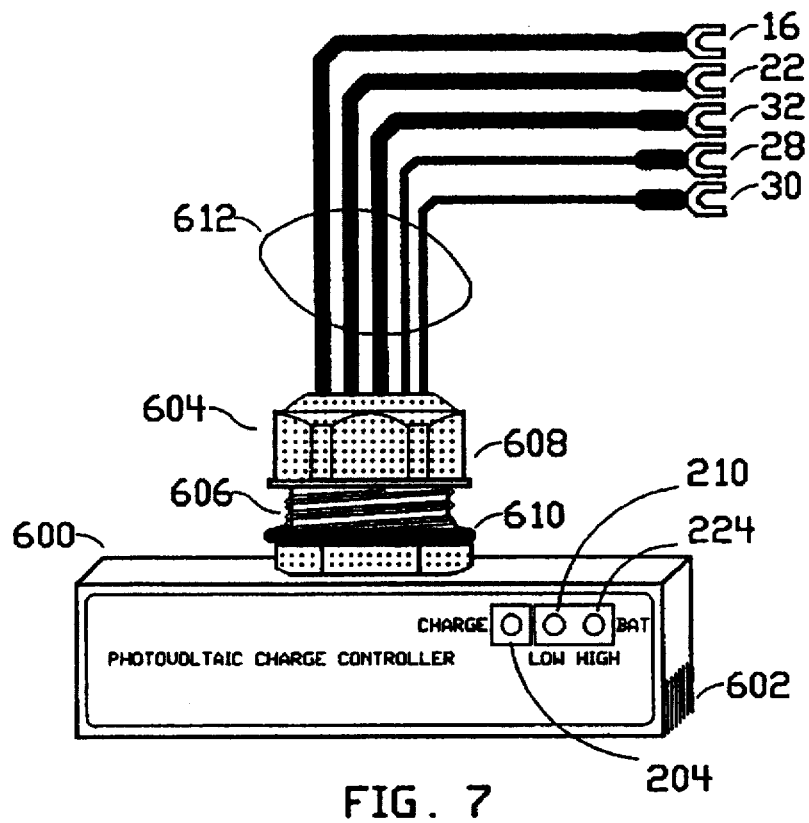
FIG. 7 illustrates an isometric view of a preferred embodiment of the invention, in which leads are employed to implement the principles of the invention.

In FIG. 7, there is illustrated a preferred embodiment of a mechanical assembly of a charge control apparatus according to this invention, said mechanical assembly comprising housing means 600, connector means 604, and leads for system connection 612, including photovoltaic array "+" connection terminal 16, common "−" connection terminal 22, battery "+" connection terminal 32, battery temperature sensor connection terminal 28, and one setpoint control terminal 30, for the exemplary case of three possible charge setpoint conditions. Housing means 600, may be any suitable enclosure for the circuit means embodied by this invention, preferably comprising a fully sealed, weatherproof and rugged mechanical package, constructed of aluminum or other suitable material. For the case of dissipative charge control implementations, as with semiconductor-based shunt, series-pass and linear regulation designs, housing means 600 may be sized to permit adequate heat dissipation, with additional cooling provided by a suitably designed arrangement of heat sink fins, as indicated by means 602. In a preferred embodiment, housing means 600, may include ports to accommodate display LEDs, for example charge LED 204, low battery voltage LED 210, and high battery voltage LED 224.

With continued reference to FIG. 7, connector means 604, comprising threaded body 606, removable panel securing nut 608, and O-ring seal 610, may be any suitable cable gland connector permanently fitted to housing means 600 and providing a conduit for connection leads 612. Thus, the mechanical assembly of FIG. 7, is operative through connector means 604, to permit a weatherproof attachment of said assembly to any suitable system enclosure, such as a photovoltaic panel junction box, power distribution panel, or system control panel, leaving weatherproof housing means 600 exterior, and all connection cables and terminations interior, to said enclosure.

Figure 8:
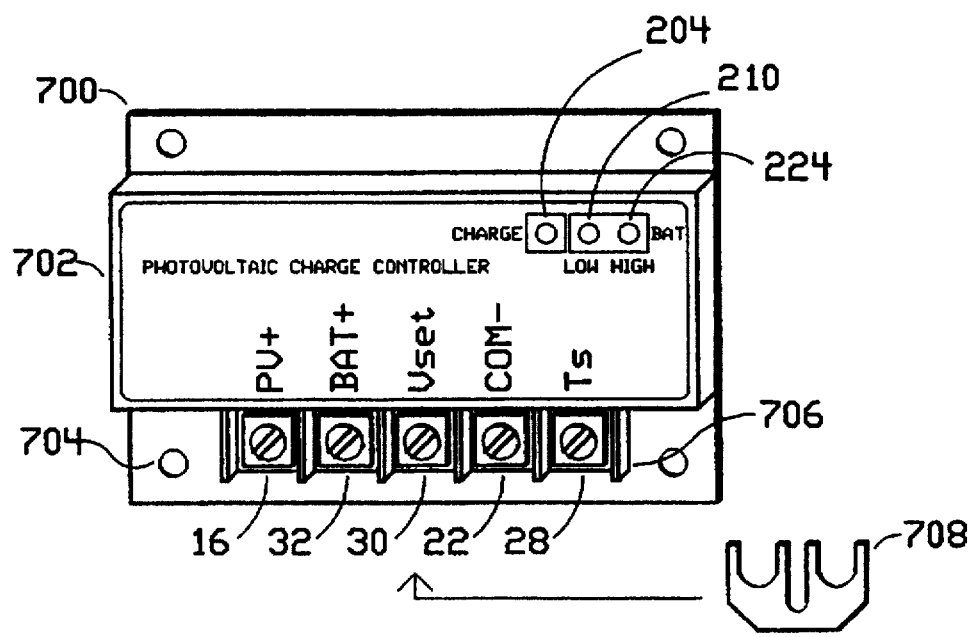
FIG. 8 illustrates an isometric view of a preferred embodiment of the invention, in which a terminal strip is employed to implement the principles of the invention.

In FIG. 8, there is illustrated another preferred embodiment of a mechanical assembly of a charge control apparatus according to this invention, said mechanical assembly comprising mounting plate 700, housing means 702, and terminal strip 706 for system connection, including photovoltaic array "+" connection terminal 16, common "−" connection terminal 22, battery "+" connection terminal 32, battery temperature sensor connection terminal 28, and one setpoint control terminal 30, for the exemplary case of three possible charge setpoint conditions. Housing means 702, may be any suitable enclosure for the circuit means embodied by this invention, said housing means forming a fully sealed, weatherproof and rugged mechanical package when assembled to mounting plate 700. Terminal strip 706 is preferably configured with the charge setpoint control termination 30, interposed between the battery termination 32 and the common "−" termination 22, to facilitate the selection of setpoint conditions by means of jumper means 708.

With continued reference to FIG. 8, mounting plate 700 may include means for mounting the assembly to a suitable surface of a control panel, or other enclosure, said means comprising mounting holes 704 in the exemplary embodiment described here. For the case of dissipative charge control implementations, the mechanical assembly of FIG. 8 may be sized to permit adequate heat dissipation, with mounting plate 700 preferably constructed of aluminum or other high thermal conductivity material. In a preferred embodiment, housing means 702, may include ports to accommodate display LEDs, for example charge LED 204, low battery voltage LED 210, and high battery voltage LED 224.

Figure 9:
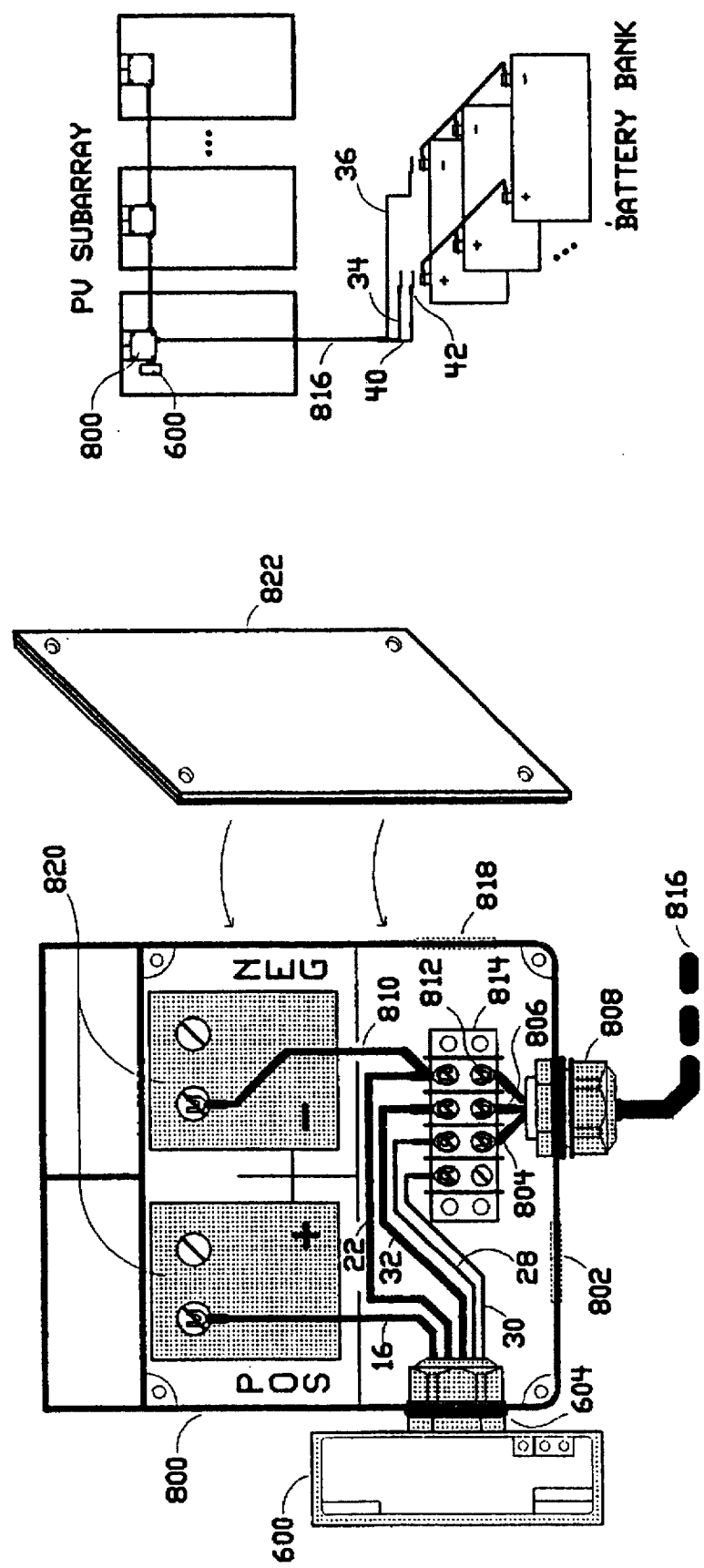
FIG. 9 illustrates a preferred mode of implementation of the invention for the exemplary case of connection to a photovoltaic panel junction box.

To assist one skilled in the art, there is illustrated in FIG. 9 a practical utilization of this invention for the exemplary case of charge controller assembly and connection to a photovoltaic panel junction box. A junction box, typically located at he back surface of a photovoltaic panel, permits the interconnection of the panel to other panels and to system components. In FIG. 9, there is illustrated a typical photovoltaic junction box 800, generally comprising a weatherproof enclosure and having PV "+" and PV "−" connection means 820, terminal strip 814, and removable cover 822. "Knockout" ports, such as 802 and 818, are located at various sites along the junction box wall to permit connection cables to be brought in by means of cable gland connectors. Thus, an exemplary utilization of this invention may involve the installation of charge controller 600, to junction box 800, by means of cable gland connector 604, wherein said installation provides a weatherproof enclosure for connection terminals within the junction box upon installation of cover 822, while leaving controller 600 outside of the junction box for improved heat transfer and access to status display LEDs.

With continued reference to FIG. 9, charge controller terminations 16, 22, 32, 28, and 30 are connected to junction box terminals 820 and 814 in accordance with the schematic illustration of FIG. 1. System cable 816, comprising battery "+" connection terminal 806, common "−" connection terminal 812, and battery temperature sensor connection terminal 804, is brought into junction box 800 by means of cable gland connector 808. An alternative arrangement to that illustrated would be to have a separate shielded battery temperature sensor cable, with provisions for grounding the shield, said cable introduced by means of a separate cable gland and junction box port. A separate shielded battery sensor cable would be used in situations where the cable is required to be excessively long, or in high electrical noise environments, for example. In FIG. 9, setpoint control termination 30 is illustrated in the no contact (NC) position. It is obvious that setpoint control termination 30 may also be connected to battery "+" termination 806 (or 32), or common "−" termination 812 (or 22), thereby providing three distinct charge setpoint conditions in accordance with the present invention.

In order to provide an exemplary illustration of a sub array connection according to the foregoing discussion, there is illustrated in FIG. 9 a pictorial view of a photovoltaic sub array and battery bank, wherein connection between the sub array and battery back is made by means of battery "−" cable 36, battery "+" cable 34, and battery temperature sensor cable 40 connected to sensor 42. In a given subarray implementation, the number of interconnected photovoltaic panels would be determined by the voltage and current rating of the charge controller, large systems comprising several subarrays of the form illustrated.

Figure 10:
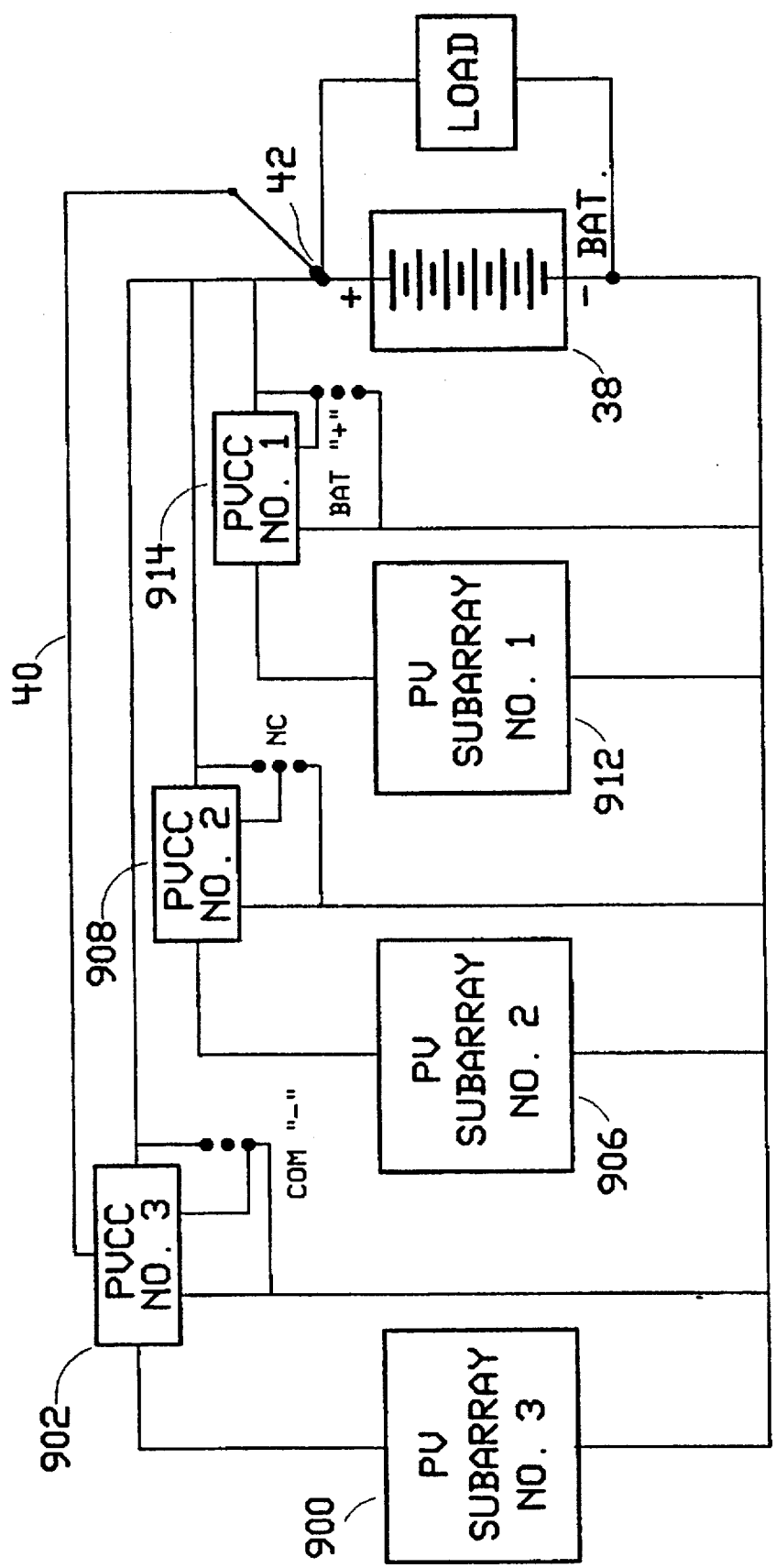
FIG. 10 illustrates a preferred mode of implementation of the invention for the exemplary case of sequential subarray control-based on the selection of progressively higher charge voltage setpoint thresholds.
Figure 11:
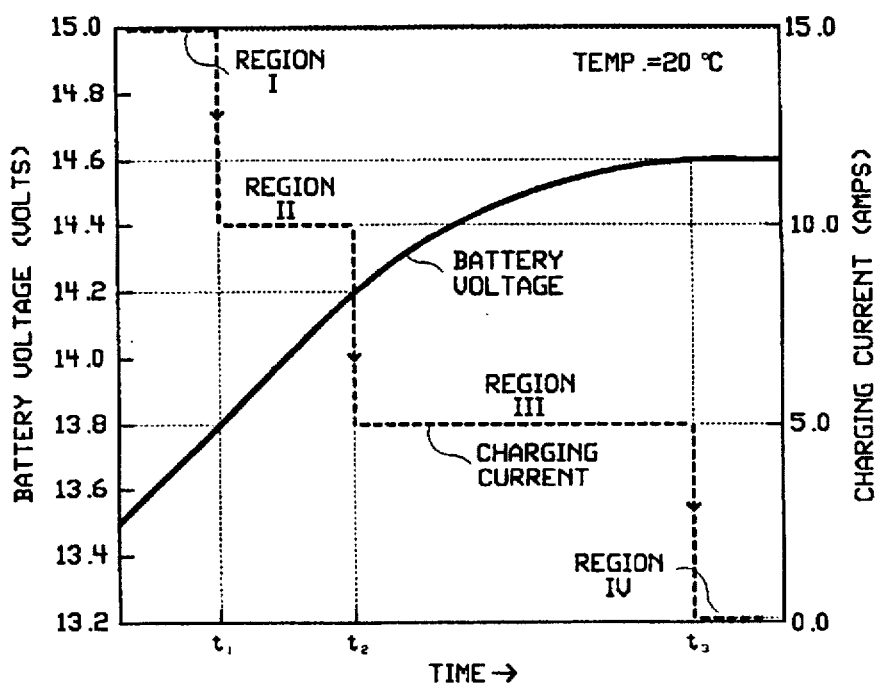
FIG. 11 illustrates battery charging characteristics for the exemplary case of sequential subarray control shown in FIG. 10.
Figure 12:
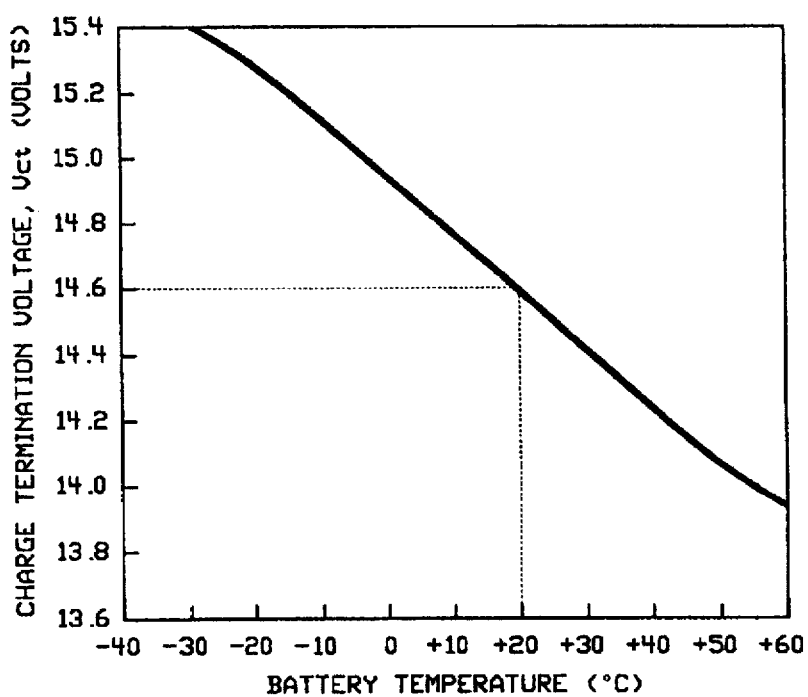
FIG. 12 illustrates charge termination threshold voltage as a function of temperature for subsystem 3 of sequential subarray control shown in FIG. 10.

To further assist one skilled in the art, FIGS. 10, 11, and 12 are presented to illustrate a numerical example which details a specific embodiment of the present invention for the charge control method known in the art as "shedding". "Shedding" is an approach of battery charge control whereby the photovoltaic array is electrically subdivided into subarrays which are sequentially removed from, or included in, the charging circuit, based on the measured terminal voltage of the battery or other state-of-charge indicative parameter.

Conventional lead-acid storage batteries exhibit a nominal recharging potential of about 2.4 volts per cell. Therefore, for a typical 12 volt battery system having a six-cell configuration, the nominal recharging potential at 20° C. is 14.4 volts. However, depending on the specific application and temperature environment, the optimum recharging potential may in fact be in the range 13.0 volts to over 15.0 volts. This broad range of recharging potential may be accommodated in the same charge control apparatus in accordance with battery temperature compensated, multiple setpoint control embodied by this invention.

By way of example and not limitation, FIG. 10 illustrates a photovoltaic system comprising three subsystems, each subsystem including a photovoltaic sub array and charge controller, said charge controllers having a single setpoint control means, providing three possible charge setpoint conditions. Photovoltaic Charge Controller (PVCC) No. 1, designated 914, is set at the battery "+" charge setpoint condition, corresponding to a charge termination threshold of 13.8 volts, PVCC No. 2, designated 908, is set at the no contact (NC) condition, corresponding to a charge termination threshold of 14.2 volts, and PVCC No. 3, designated 902, is set at the common "−" condition, providing a charge termination threshold of 14.6 volts, all values being somewhat arbitrary but appropriate for the example under consideration. Charge resumption thresholds would typically be one volt below the corresponding termination threshold, or 12.8 volts, 13.2 volts, and 13.6 volts, respectively. In addition to the room temperature (20° C.) setpoints thus established, PVCC No. 3, designated 902, also incorporates battery temperature compensation means provided by cable 40 and sensor means 42. The battery charge temperature coefficient is the rate at which the full-charge battery voltage varies with temperature, and is typically specified in millivolts per °C. per cell. This rate is typically between −3 mV/°C. and −5 mV/°C. per cell for a lead-acid battery system. For the purposes of the example under consideration, a temperature coefficient of −3 mV/°C. per cell will be used, resulting in an overall coefficient of −18 mV/°C. for a six-cell battery system.

FIG. 11 illustrates the charging characteristics at 20° C. provided by the system of FIG. 10, using the numbers of the foregoing discussion and the additional assumption of 5 A charging current from each subsystem. Before time t1, all three subsystems contribute to battery charging, resulting in the 15 A rapid charging region of REGION I. At charging time t1, the 13.8 volt charge termination threshold of PVCC No. 1 is reached, causing PV Subarray No. 1 to be eliminated from the charging system and a reduction in charging current to 10 A. Thus, the interval between t1 and t2, designated REGION II, corresponds to an intermediate charge rate, with subsystems 2 and 3 operative to effect battery charging. At charging time t2, the 14.2 volt charge termination threshold of PVCC No. 2 is reached, causing PV Subarray No. 2 to be eliminated from the charging system, with a transition in charging current to 5 A. Battery charging continues at the lower 5 A rate of REGION III until charging time t3 is reached, corresponding to the 14.6 volt charge termination threshold of PVCC No. 3. At charging time t3, Subarray No. 3 is eliminated from the charging system, marking the full charge, zero charging current region, designated REGION IV.

It is noted that the foregoing example describes independent setpoint control for up to three subarrays. A charge control implementation of this invention involving two setpoint control terminations, for example, could provide independent setpoint control for up to nine subarrays in a sequential "shedding" system such as that illustrated in FIG. 10.

Finally, the effect of battery temperature on the charging characteristics of the system of FIG. 10 is considered. In FIG. 12, there is illustrated the charge termination threshold voltage of PVCC No. 3, as a function of temperature, for a temperature coefficient of −18 mV/°C. At 20° C., the charge termination threshold is 14.6 volts, as noted in the foregoing discussion and indicated in FIG. 12. At temperatures above 20° C., the charge termination voltage decreases approximately linearly at first, eventually leveling off towards a high temperature asymptotic value determined primarily by the characteristics of the temperature sensor. At temperatures below 20° C., the charge termination voltage increases approximately linearly at first, eventually leveling off towards a low temperature asymptotic value determined primarily by the resistive network of the temperature sensor circuit. Thus, setpoint thresholds are temperature dependent in accordance with the optimum temperature dependent charging characteristics of the battery.

From the foregoing description, it will be appreciated that this invention embraces the concept of electronic control of battery charging comprising temperature compensated, multiple charge voltage setpoint control, said control effected without human intervention upon the initial setting of a particular charge control condition in accordance with the methods and apparatus described herein. In particular, upon providing a circuit, such as illustrated in FIGS. 1 and 2, and implementing the methods described herein, there is provided a means of selecting a specific charge voltage setpoint condition from a plurality of charge voltage setpoint possibilities, based on battery characteristics, operating temperature and other system considerations, said multiple setpoint selection means including temperature compensation to maintain setpoint thresholds essentially constant with temperature, and battery temperature compensation means, to effect a change in setpoint thresholds with battery temperature in accordance with battery characteristics.

It will be appreciated that the principles of the invention as described herein can be applied in many ways of which the circuit of FIG. 2 is but one example. In particular, thermistors have been employed for internal and battery temperature compensation, whereby a detectable characteristic of the thermistors, namely resistance, changes in response to temperature changes. Other electrical devices are available which can be used in place of thermistors to sense temperature in the present invention, including the use of such temperature sensing means in the Vref branch instead of the Vb branch of operational amplifier means 102 of FIG. 2, with appropriate changes to circuit elements and configurations exemplified in this embodiment. Also, in the particular embodiment of multiple setpoint control hereinbefore described, battery charge control is effected by means of the two state output of a comparator circuit. In an alternate embodiment of multiple setpoint control, battery charging may be implemented in a continuous fashion, as in the pulse-width-modulation charge control technique for example, by incorporating the principles described herein to provide multiple bias voltage potentials at the battery voltage sensing input of an error amplifier. Therefore, as will be apparent to one skilled in the art, other circuit configurations may be employed in the present invention while utilizing the concepts embodied herein.

Finally, this invention is not limited to use with photovoltaic panels, but rather may be applicable to any electrical energy source whose voltage-current characteristic is similar to that of photovoltaic panels, or whose output may otherwise be regulated for the purpose of charging an electrical energy storage device by any of the methods, circuits, and apparatus embodied herein.

Therefore, this invention is in no way limited to those of its modes of employment, embodiments and uses which have been described explicitly. Rather, it encompasses all changes and modifications which may be derived by those skilled in the art, and which are within the spirit, scope and extent of the invention as set forth in the following claims.

I claim:

1. A method of controlling the charging of a rechargeable electrical energy storage device by an electrical energy source, said source having charging output terminals and said storage device having charging input terminals, said charge control method effected through charge control apparatus interposed between said source and said storage device, the improvement comprising the selection of a particular charge setpoint condition, including charge termination and resumption voltage thresholds, from a plurality of charge setpoint possibilities.

2. A method according to claim 1, comprising the electrical connection of one or more charge setpoint control terminations to one of three electrical potential contacts, each connection thus executed resulting in a specific and predefined charge setpoint condition, including charge termination voltage threshold and charge resumption voltage threshold, the three electrical potential contacts being: storage device "+"; no contact (NC); and common "−".

3. A method according to claim 2, including monitoring the voltage of said storage device, producing a bias voltage indicative of storage device state-of-charge, and producing a reference voltage indicative of a predetermined charged level of the storage device.

4. A method according to claim 3, wherein said bias voltage and said reference voltage are operative in controlling the charging of the storage device by the source.

5. A method according to claim 2, wherein said charge setpoint control terminations are operative to provide a plurality of charge setpoint conditions, including charge termination and resumption voltage thresholds, by providing a plurality of possible bias voltage conditions.

6. A method according to claim 5, wherein charge control apparatus temperature is measured and temperature compensation is employed to maintain charge setpoint conditions, including charge termination and resumption voltage thresholds, essentially constant with charge control apparatus temperature.

7. A method according to claim 6, wherein storage device temperature is measured and employed to continuously modify charge setpoint conditions, including charge termination and resumption voltage thresholds, in a predefined manner in accordance with temperature dependent storage device charging characteristics.

8. A method of multiple setpoint charge control for controlling the charging of a rechargeable electrical energy storage device by an electrical energy source, said method comprising:

connecting one or more charge setpoint control terminations to one of the three electrical potential contacts storage device "+", no contact (NC), and common "−";

monitoring the voltage of said storage device, and producing a bias voltage indicative of storage device state-of-charge and a reference voltage indicative of a predetermined charged level of the storage device;

providing charge control, including termination and resumption of storage device charging, based on the measured values of said bias voltage and said reference voltage;

providing a plurality of bias voltage possibilities by means of charge setpoint control terminations;

measuring charge control apparatus temperature—and employing temperature compensation to maintain charge setpoint thresholds essentially constant with charge control apparatus temperature;

measuring storage device temperature and employing temperature compensation to continuously modify charge setpoint thresholds in a predefined manner in accordance with temperature dependent storage device charging characteristics.

9. A method according to claim 8, wherein the electrical energy storage device comprises rechargeable battery means and the electrical energy source comprises photovoltaic panel means.

10. A method according to claim 8, wherein charge control comprises the on-off switching of a shunt control element, said control being operative through shunt control means.

11. A method according to claim 8, wherein charge control comprises the on-off switching of a series-pass control element, said control being operative through series-pass control means.

12. A method according to claim 8, wherein charge control comprises the switching of a series-pass control element on for high rate charging and off for low rate charging through a float regulator, said control being operative through high-low charge rate control means.

13. A method according to claim 8, wherein charge control comprises the pulse-width-modulation switching of a shunt control element, said control being operative through pulse-width-modulation charge control means.

14. A charge control apparatus for controlling the charging of a rechargeable electrical energy storage device by an electrical energy source, said source having charging output terminals and said storage device having charging input terminals, said apparatus interposed between said source and said storage device, the improvement comprising means for selecting a particular charge setpoint condition, including charge termination and resumption voltage thresholds, from a plurality of charge setpoint possibilities.

15. An apparatus according to claim 14, comprising:

charge control means operative to include, remove, or regulate charging power from said source to said storage device;

setpoint control means operative to establish charge setpoint conditions, including charge termination and resumption voltage thresholds, from a plurality of charge setpoint possibilities;

driver means interposed between charge control means and setpoint control means, operative to provide an electrical control signal to charge control means in cooperation with setpoint control means.

16. An apparatus according to claim 15, wherein said multiple charge setpoint control means includes one or more charge setpoint control terminations, each termination thereof capable of connection to one of three electrical potential contacts, each connection thus executed resulting in a specific and predefined charge setpoint condition, including charge termination voltage threshold and charge resumption voltage threshold, the three electrical potential contacts being: storage device "+"; no contact (NC); and common "−".

17. An apparatus according to claim 16, wherein said multiple charge setpoint control means further includes means for monitoring the voltage of the rechargeable electrical energy storage device and producing a bias voltage, a reference voltage, and means for comparing the two voltages thus produced, wherein said reference voltage is indicative of a predetermined charged level of said storage device and said bias voltage is indicative of the storage device state-of-charge.

18. An apparatus according to claim 17, wherein said comparing means comprises a comparator having two input terminals and an output terminal, said comparator means having a plurality of bias voltage potential possibilities at one input, corresponding to a plurality of charge setpoint possibilities, and said reference voltage potential at another input, the inputs to said comparator means deriving their potentials from the storage device to be charged and the output of said comparator means providing operative control to charge control means through driver means.

19. An apparatus according to claim 18, wherein one or more charge setpoint control resistors are interposed between the bias input of said comparator means and said charge setpoint control terminations.

20. An apparatus according to claim 18, wherein a feedback resistor is connected between the bias input and the output of said comparator means, said feedback resistor being operative to produce hysteresis and smooth state transitions in the output of said comparator means.

21. An apparatus according to claim 18, wherein the reference voltage potential means comprises zener diode means acting through comparator means.

22. A charge control apparatus for controlling the charging of a rechargeable electrical energy storage device by an electrical energy source, said apparatus comprising charge control means, driver means, and setpoint control means, said setpoint control means comprising:

means for monitoring the voltage of said rechargeable electrical energy storage device;

means for producing a reference voltage indicative of a predetermined charged level of the storage device;

means for producing a bias voltage indicative of said monitored storage device voltage;

multiple charge setpoint control means capable of producing a plurality of bias voltage conditions, each bias voltage condition produced thereof corresponding to a predefined charge setpoint condition, including charge termination voltage threshold and charge resumption voltage threshold;

one or more charge setpoint control terminations operative to effect said multiple charge setpoint control;

comparator means for comparing the bias voltage potential and the reference voltage potential, said comparator means producing a first condition control signal for the termination of charging or reduction to float charging of the storage device, in response to said bias voltage potential exceeding the level of said reference voltage potential, and a second condition control signal for the resumption of high-rate charging of the storage device, in response to said bias voltage potential falling below said reference voltage potential, said second condition control signal occurring at a lower storage device voltage than said first condition signal, the difference in storage device voltage for said first and second conditions determined by hysteresis feedback means acting through comparator means.

23. An apparatus according to claim 22, wherein said multiple charge setpoint control means further includes internal temperature compensation means operative to maintain charge setpoint thresholds substantially constant with apparatus temperature variations.

24. An apparatus according to claim 23, wherein said internal temperature compensation means comprises temperature sensing means acting through bias voltage means.

25. An apparatus according to claim 24, wherein said temperature sensing means is a thermistor connected in parallel with a resistor, said thermistor-resistor parallel combination being in circuit with bias voltage means.

26. A charge control apparatus for controlling the charging of a rechargeable electrical energy storage device by an electrical energy source, said apparatus comprising charge control means, driver means, and setpoint control means, said setpoint control means comprising:

multiple charge setpoint control means capable of producing a plurality of bias voltage conditions, each bias voltage condition produced thereof corresponding to a predefined charge setpoint condition, including charge termination voltage threshold and charge resumption voltage threshold;, one or more charge setpoint control terminations operative to effect said multiple charge setpoint control;

temperature-compensation means operative to measure the internal temperature of charge control apparatus and modify in a predefined manner said bias voltage employed in multiple charge setpoint control, in order to maintain charge setpoint thresholds substantially constant with changes in charge control apparatus temperature.

27. An apparatus according to claim 26, wherein said temperature compensated multiple charge setpoint control means further includes means for measuring storage device temperature, said storage device temperature measuring means being operative to continuously modify charge setpoint thresholds, including charge termination and resumption voltage thresholds, in a predefined manner in accordance with temperature dependent storage device charging characteristics.

28. An apparatus according to claim 27, wherein said storage device temperature measuring means comprises temperature sensing means in thermal contact with, and deriving operative power from, said storage device.

29. An apparatus according to claim 28, wherein said temperature sensing means comprises a thermistor, said thermistor being in circuit with bias voltage means through connection cable means.

30. An apparatus according to claim 29, wherein the connection of said thermistor with said bias voltage means further includes the parallel connection of said thermistor with a resistor, said thermistor-resistor means operative to determine the storage device temperature dependency of multiple charge setpoint thresholds.

31. A charge control apparatus for controlling the charging of a rechargeable electrical energy storage device by an electrical energy source, said apparatus comprising charge control means, driver means, and setpoint control means, said setpoint control means comprising:

multiple charge setpoint control means capable of producing a plurality of bias voltage conditions, each bias voltage condition produced thereof corresponding to a predefined charge setpoint condition, including charge termination voltage threshold and charge resumption voltage threshold;

one or more charge setpoint control terminations operative to effect said multiple charge setpoint control;

temperature compensation means operative to measure the internal temperature of charge control apparatus and modify in a predefined manner said bias voltage employed in multiple charge setpoint control, in order to maintain charge setpoint thresholds substantially constant with changes in charge control apparatus temperature;

means for sensing and measuring storage device temperature, said storage device temperature sensing and measuring means being operative to continuously modify charge setpoint thresholds, including charge termination and resumption voltage thresholds, in a predefined manner in accordance with temperature dependent storage device charging characteristics.

32. An apparatus according to claim 31, wherein the charge control means comprises shunt charge control means.

33. An apparatus according to claim 31, wherein the charge control means comprises series-pass charge control means.

34. An apparatus according to claim 31, wherein the charge control means comprises high-low charge rate control means, including high charge rate means operative through setpoint control means, and float regulator means for low rate charging.

35. An apparatus according to claim 14, comprising:

shunt means operative to include, remove, or regulate charging power from said source to said storage device;

blocking diode means operative to isolate said storage device from said source during shunting and to prevent discharge of said storage device through said source when storage device voltage is greater than source voltage;

ramp generator means operative to produce a continuous ramp waveform having a predetermined frequency;

error amplifier means operative to produce a DC output with a magnitude proportional to the difference between a bias voltage at one input and a reference voltage at another input;

pulse-width-modulation comparator means having said continuous ramp waveform at one input and said DC output at another input, operative to produce a width modulated train of pulses at its output, said pulses having a duty cycle indicative of the state-of-charge of said storage device;

driver means interposed between shunt means and pulse-width-modulation comparator means, operative to provide an electrical control signal to said shunt means in cooperation with said pulse-width-modulation comparator means.

36. An apparatus according to claim 35, wherein said reference voltage is indicative of a predetermined charged level of the storage device.

37. An apparatus according to claim 35, wherein said bias voltage is indicative of the state-of-charge of the storage device.

38. An apparatus according to claim 35, further including multiple setpoint control means operative to establish a specific and predetermined pulse-width-modulation charge setpoint condition from a plurality of charge setpoint possibilities, including termination and resumption voltage thresholds for pulse-width-modulation charging of the storage device by the source.

39. An apparatus according to claim 38, wherein said multiple charge setpoint control means further comprises one or more charge setpoint control terminations, each termination capable of connection to one of three electrical potential contacts, each connection thus executed resulting in a specific and predefined charge setpoint condition, the three electrical contacts being: electrical storage device "+"; no contact (NC); and common "−".

40. An apparatus according to claim 39, wherein one or more charge setpoint control resistors are interposed between said charge setpoint control terminations and said bias input of error amplifier means.

41. An apparatus according to claim 35, including temperature compensation means operative on said bias voltage means to maintain setpoint thresholds substantially constant with apparatus temperature variations.

42. An apparatus according to claim 35, including means for sensing and measuring storage device temperature, said storage device temperature sensing and measuring means being operative to continuously modify charge setpoint thresholds, including pulse-width-modulation charge termination and resumption voltage thresholds, in a predefined manner in accordance with temperature dependent storage device charging characteristics.

43. A charge control apparatus for controlling the charging of a rechargeable electrical energy storage device by an electrical energy source, said apparatus employing pulse-width-modulation charge control comprising:

multiple charge setpoint control means capable of producing a plurality of bias voltage conditions, each bias voltage condition produced thereof corresponding to a predefined charge setpoint condition, including pulse-width-modulation charge termination voltage threshold and charge resumption voltage threshold;

one or more charge setpoint control terminations operative to effect said multiple charge setpoint control;

temperature compensation means operative to measure the internal temperature of charge control apparatus and modify in a predefined manner said bias voltage employed in multiple charge setpoint control, in order to maintain charge setpoint thresholds substantially constant with changes in charge control apparatus temperature;

means for sensing and measuring storage device temperature, said storage device temperature sensing and measuring means being operative to continuously modify charge setpoint thresholds, including pulse-width-modulation charge termination and resumption voltage thresholds, in a predefined manner in accordance with temperature dependent storage device charging characteristics.

44. An apparatus according to claim 31, wherein the electrical energy storage device comprises rechargeable battery means and the electrical energy source comprises photovoltaic panel means.

45. An apparatus according to claim 31, enclosed in a sealed housing, wherein connection terminations to the electrical energy source positive, the electrical storage device positive, the common negative, the battery temperature sensor, and one or more charge setpoint control connection terminations are provided external to said sealed housing.

46. An apparatus according to claim 45, wherein said connection terminations provided external to said sealed housing means are comprised of leads having connector terminals to effect said connection thereof.

47. An apparatus according to claim 46, wherein said leads provided external to said sealed housing means are provided thereby through cable gland connector means.

48. An apparatus according to claim 47, wherein said cable gland connector means is permanently attached to said sealed housing means.

49. An apparatus according to claim 48, wherein said cable gland connector means comprises means for attaching said cable gland and sealed housing assembly to a suitable weatherproof enclosure, with all connection cables and terminations thereof being interior of said enclosure.

50. An apparatus according to claim 45, wherein said connection terminations provided external to said sealed housing means are comprised of a plurality of terminal contacts in the form of a terminal strip.

51. An apparatus according to claim 50, wherein said terminal strip is permanently attached to said sealed housing means.

52. An apparatus according to claim 51, wherein said sealed housing means further comprises mounting plate means to permit attachment of the assembly thereof within a suitable weatherproof enclosure.

53. An apparatus according to claim 43, wherein the electrical energy storage device comprises rechargeable battery means and the electrical energy source comprises photovoltaic panel means.

54. An apparatus according to claim 43, enclosed in a sealed housing, wherein connection terminations to the electrical energy source positive, the electrical storage device positive, the common negative, the battery temperature sensor, and one or more charge setpoint control connection terminations are provided external to said sealed housing.

* * * * *